United States Patent [19]

Siewert

[11] 4,179,015

[45] Dec. 18, 1979

[54] MULTIPLE PARKING BRAKE

[75] Inventor: Robert L. Siewert, Benton Harbor, Mich.

[73] Assignee: Clark Equipment Company, Buchanan, Mich.

[21] Appl. No.: 956,462

[22] Filed: Oct. 30, 1978

[51] Int. Cl.² ............................................. F16D 65/30
[52] U.S. Cl. .............................. 188/106 P; 188/2 R; 188/170; 404/132
[58] Field of Search ............... 188/2 R, 106 A, 106 R, 188/106 F, 106 P, 170; 404/122, 128, 132

[56]  References Cited
U.S. PATENT DOCUMENTS

| | | | |
|---|---|---|---|
| 1,707,987 | 4/1929 | Likas | 188/2 R |
| 1,841,532 | 1/1932 | Hoffman | 188/2 R X |
| 2,192,021 | 2/1940 | Weeks | 188/106 F X |
| 2,409,908 | 10/1946 | Simpkins | 188/170 X |
| 3,136,399 | 6/1964 | Granryd | 188/170 X |

Primary Examiner—Duane A. Reger
Attorney, Agent, or Firm—Mack L. Thomas

[57] ABSTRACT

A compactor module is adapted to be attached to a tractor module to form a complete unit. Eight pneumatic tires support the rear portion of the compactor. An emergency or parking brake is attached to each compacting wheel. The brakes are interconnected by a continuous cable and pulley control system. All brakes are applied in unison when the cable tension in the control system is increased, due to the retraction of a piston rod of an air cylinder connected to one end of the cable. The rod retracts when the pressure in the air cylinder falls below a certain predetermined level. The rod projects outwardly when the pressure in the air cylinder returns above the predetermined level. The tension in the control system is relaxed when the air pressure in the cylinder again rises above the predetermined level, the rod returns to its extended position, and the brakes are substantially simultaneously released. The other end of the cable is attached to a winch. Regardless of the position of the piston rod, the brakes can be applied or released by winding or unwinding cable from the winch to vary cable tension in the control system.

5 Claims, 5 Drawing Figures

MULTIPLE PARKING BRAKE

The Government has rights in this invention pursuant to Contract No. DAAE07-75-C-0051 awarded by the Department of Defense.

BACKGROUND OF THE INVENTION

1. Field of the Invention

This invention relates to improvements in multiple parking brake systems for a series of parallel wheels of a pneumatic tire compactor and, in particular, to an improved control system for multiple parking brakes with a mechanical override to apply or release each brake. The control system provides for substantially simultaneous brake application, where failure of one brake mechanism will not affect the other brakes.

2. Description of the Prior Art

It is well known to use a plurality of parallel rubber tires as a compactor. The parking emergency brake mechanism utilized in the compactor is of known construction. Additionally, air released, spring applied parking brakes are also taught in the prior art. For example, see U.S. Pat. No. 3,136,399 to Granryd dated June 9, 1964 and U.S. Pat. No. 3,031,036 to Meyers dated Apr. 24, 1962. Cable operation in emergency or parking brakes is known. However, the cable and pulley system as described and as claimed is believed by the inventor not to be taught by the prior art.

SUMMARY OF THE INVENTION

A continuous cable is strung around a system of pulleys. For each pair of compacting wheels the pulley system includes a pair of side-by-side parallel pulleys fixed above a movable or free pulley. The cable is first strung around one of the fixed pulleys and secondly around the free pulley, and finally over the other fixed pulley and then through a tube to a fixed pulley for the next pair of wheels.

One end of the cable is fastened to a retractable spring loaded piston rod of an air cylinder before being strung around the pulleys. The spring in the air cylinder forces the piston rod to retract when the pressure in the air cylinder falls below a predetermined level. The rod returns to its extended position when the air pressure in the cylinder increases above the predetermined level.

The position of the free pulleys is changed by the amount of cable in the pulley system which can be altered by the air cylinder rod or winch. When the cable in the pulley system is decreased the free pulleys move toward the fixed pulleys. When the cable is lengthened the free pulleys move away from the fixed pulleys. A cover plate protects the bottom of each of the free pulleys. Attached to each of the cover plates are the terminal ends of two brake cable lines and each is connected at their other ends to respective brake actuators on respective wheels. When the free pulleys are raised, the resultant upper brake cable line movement actuates the respective brake mechanisms. When the tension in the cable system is relaxed and the free pulleys drop downward, the tension in the brake actuators is relaxed and the drum shoes move out of contact with the drum.

The other end of the cable is wound about a winch. Winding or unwinding the cable in the winch can control the amount of cable in the pulley system and the tension of the cable. When the piston rod has retracted and the free pulleys are raised, the brakes activated by the upwardly raised cables can be deactivated by unwinding cable from the winch, regardless of the position of the piston rod.

DETAILED DESCRIPTION OF THE DRAWINGS

Figure 1:
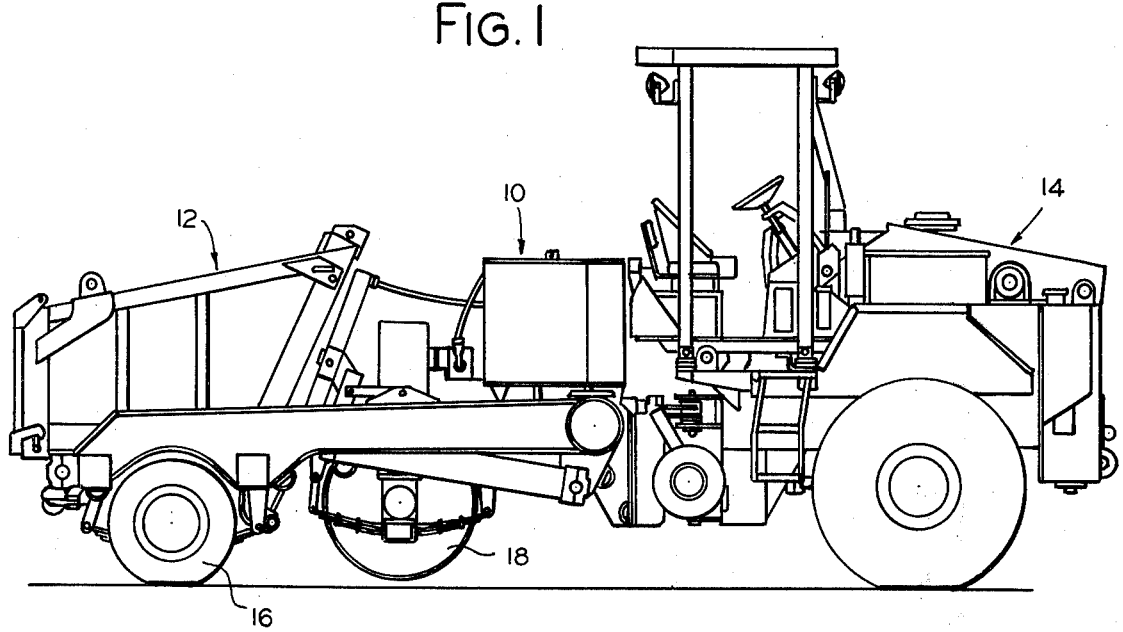
FIG. 1 is a side elevational view of a compactor module embodying the details of the present invention attached to a tractor module to form a complete unit.

Referring first to FIG. 1 of the drawings, there illustrated is a vehicle unit 10 formed by attaching a compactor module 12 to a tractor module 14. The compactor module 12 includes a plurality of parallel, spaced apart pneumatic compacting wheels 16 and a steel drum roller unit 18. The pneumatic wheels 16 and steel drum unit 18 are so positioned that when one is in compacting engagement with the supporting surface the other unit can be raised above the ground. As shown in FIG. 1 the pneumatic tired compacting wheels 16 are in contact with the ground and the steel drum roller 18 is raised above the surface.

Although the control system for brakes for compacting wheels comprising the present invention is shown in a compacting module combining rubber tired compaction wheels with a steel drum compactor, it should be understood this was done for purposes of illustration only and that for example the steel drum could be replaced with a tamping foot compactor or the control system could be used in a self-propelled vehicle having a front and back series of parallel compacting wheels.

Figure 2:
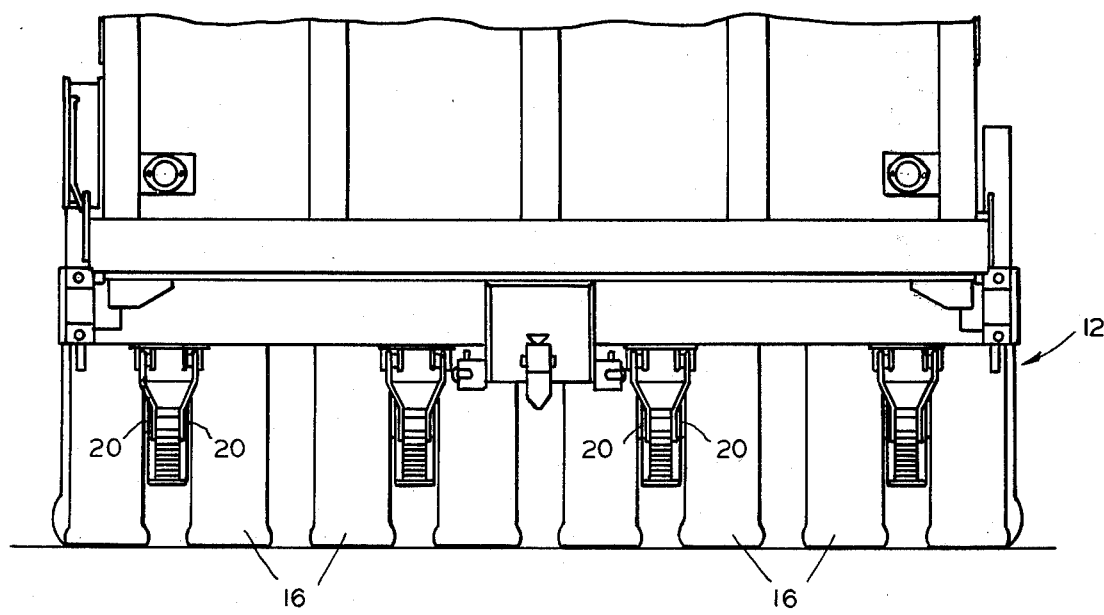
FIG. 2 is a partial end view of the compactor module shown in FIG. 1.

FIG. 2 illustrates an end view of the compacting module 12 shown in FIG. 1 and shows the eight rubber or pneumatic compacting wheels in contact with the ground. Each pair of wheels shares a common axis 20.

The two modules 12 and 14 are adapted to be connected together as more fully described in Ser. No. 824,461 assigned to the Assignee in the present invention.

Figure 4:
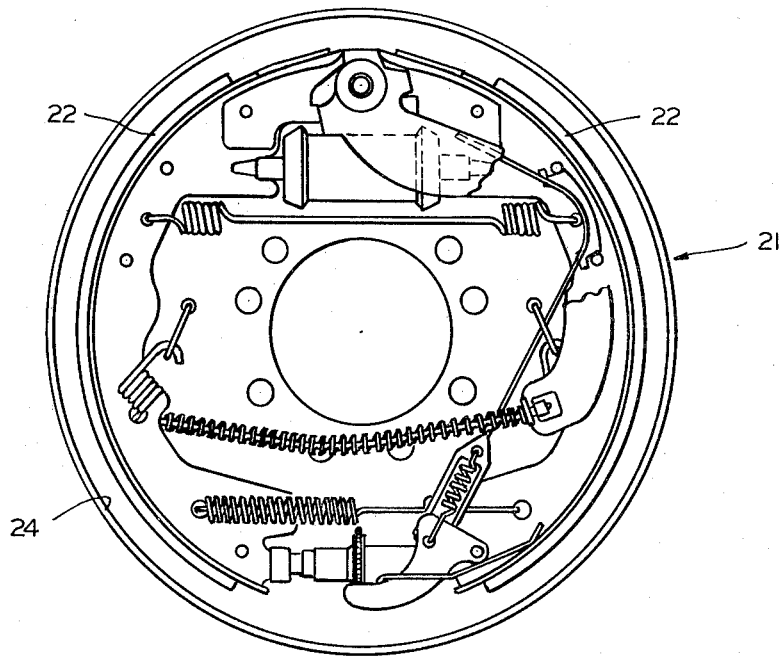
FIG. 4 is a vertical cross-sectional view of the drum brake mechanism operably associated with each wheel of the compactor.
Figure 5:
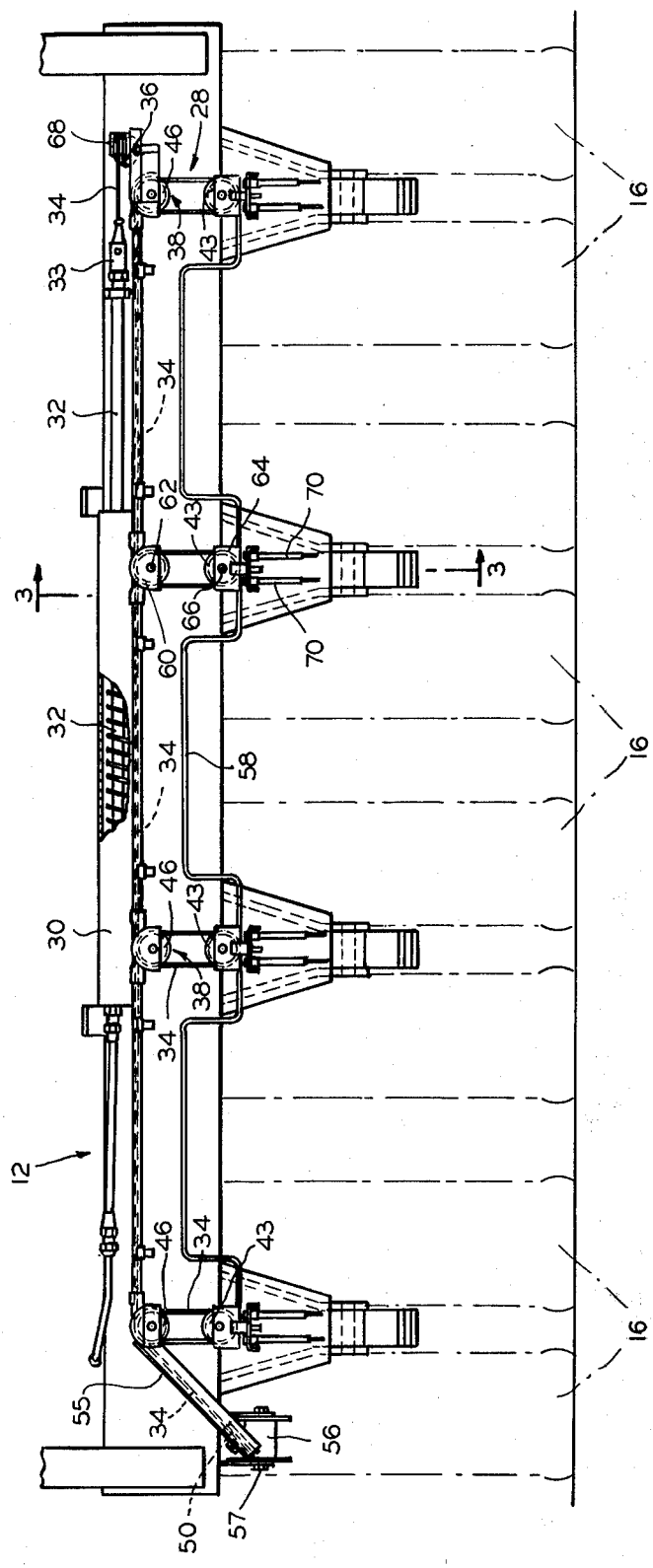
FIG. 5 is a vertical sectional view taken along line 5—5 of FIG. 3 and shows the control system.

Each of the wheels 16 has associated thereto a braking mechanism 21 as illustrated in detail in FIG. 4. The braking mechanism 21 is a brake of the common drum type and includes brake shoes 22, a brake drum 24, and an actuator 26 which forces the shoes 22 in contact with the inside of drum 24 thus braking and stopping the wheels 16 when the actuator is pulled outwardly. As seen in FIG. 5 a fluid operated air cylinder 30 has a spring loaded piston rod 32. Attached to the outer end of the piston rod 32 is a leader 33 attached to one end of a continuous cable 34 that is trained or strung around the directional control members or pulleys of the present control system 28.

As shown in detail in FIGS. 4 and 5, the cable 34 initially serves to link the rod 32 to a slanted, rotatably mounted, lead pulley 36 which alters the direction of the cable 34 and directs the cable towards the first of four identical fixed pulley assemblies 38. A surrounding protective plate 68 is provided for lead pulley 36. Included in each of the pulley assemblies 38 are two side-by-side coaxial pulleys 46 that are fixed in position and are rotatably mounted about a common pin axis 62. A protective cover assembly 60 is provided for each pulley assembly 38. A corresponding movable free pulley 43 is spaced directly below each pulley assembly 38. Each movable pulley 43 has a cover assembly 64 and is rotatably mounted about a pin axis 66. Each assembly 38 is fixed in a stationary position with respect to said movable free pulleys 43. Each pair of coaxial wheels 16 is associated with a pulley assembly 38 and corresponding free pulley 43. The cable 34 is passed through each pulley assembly 38 and corresponding movable pulley 43 in identical fashion. For example, as can be seen by comparing FIGS. 3 and 5 the pulley assembly is first passed over one of the side-by-side pulleys 46 and then looped around the movable pulley 43 and then back to the other side-by-side pulley and then through a guide tube 45 to link the adjacent assemblies 38 to the next pulley assembly 38 to repeat the above-described stringing process. After the cable 34 is strung about the last pulley assembly 38 and corresponding movable pulley 43 the other end of the cable 34 is guided through a guard 55 and over a guide pulley 50 to an anchor point at a boat-type winch 56 where the terminal other end of the continuous cable 34 is wrapped around the winch 56. A nut 57 on the winch can be rotated in either of two directions to wind or unwind cable on the winch.

Shown in FIG. 5 is a hydraulic line 58 which in the usual manner is part of a hydraulic system for each of the brake mechanisms 21. Connected with each free pulley 43 are two brake cable lines 70. Each brake cable line 70 is connected to a respective actuator 26 in each brake mechanism 21.

OPERATION

Figure 3:
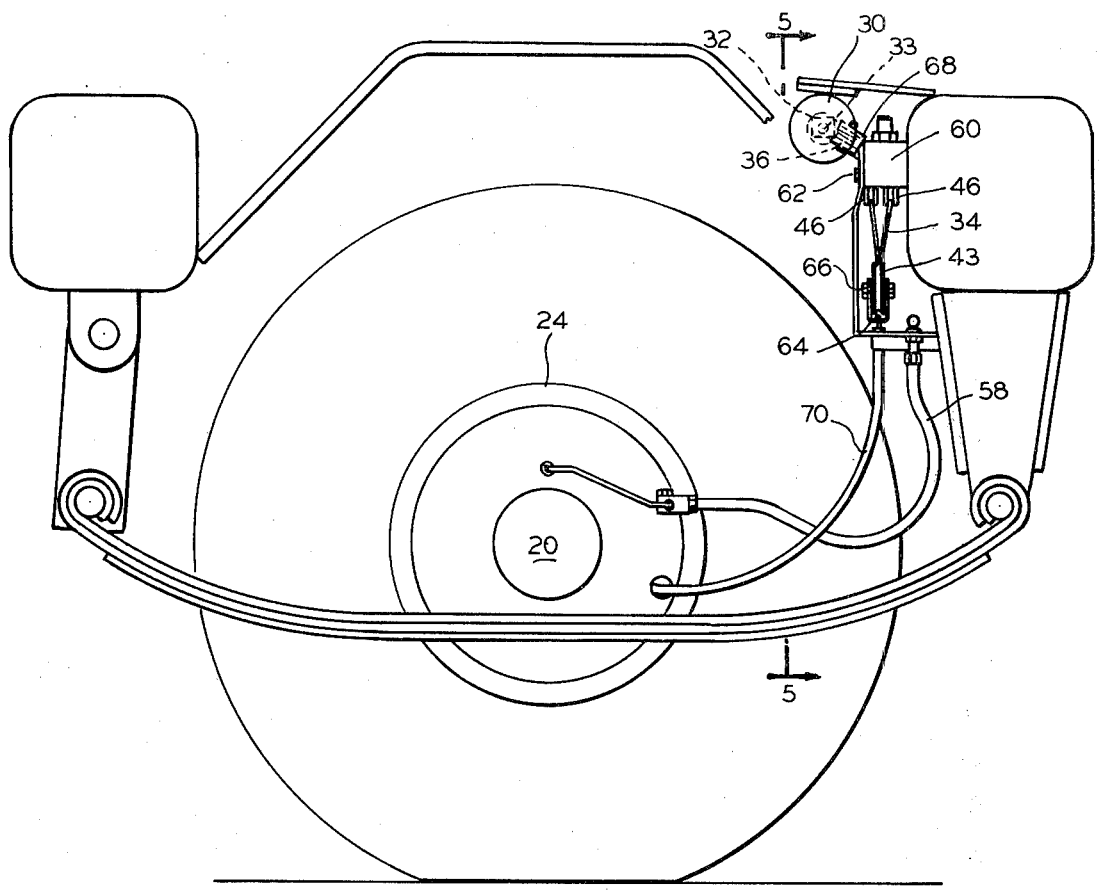
FIG. 3 is a vertical cross-sectional view taken through the axis for one of the middle pairs of wheels of one of the eight pneumatic tires and illustrates the control system of the present invention.

The preferred embodiment of the control system 28 of the present invention is disclosed in detail in FIGS. 3 and 5. The control system 28 is provided for substantially simultaneously actuating all of the braking mechanisms 21 which serve as emergency or parking brakes. The control system 28 is actuated and the braking mechanisms 21 applied when the air pressure in pneumatic air cylinder 30 drops below a certain predetermined level whereby spring loaded piston rod 32 is forced to retract inwardly.

The continuous cable 34 is fixed both at the leader 33 and at the winch 56. When the rod 32 retracts the cable tension in the control system 28 increases and each of the free pulleys 43 moves towards its respective corresponding pulley assemblies 38. Effectively this means the amount of cable 34 between the first and last pulley assemblies 38 is reduced when the free pulleys 43 each move towards their respective pulley assemblies. Also the brake cable lines 70 connected to the actuators 26 of the brake mechanisms 21, are pulled outwardly and the actuators activated when each of the free pulleys 43 move towards the pulley assemblies 38. As discussed above, when the actuators 26 are activated the brake shoes 22 are applied to the brake drum 24 and thus the brake mechanisms 21 are engaged. The rod 32 returns to its extended position when the pressure in the air cylinder 30 returns above the predetermined level. Accordingly, the cable 34 between the first pulley assembly 38 and the last pulley assembly 38 is increased, the free pulleys 43 and associated brake cable lines 70 return to their original position, and the actuators 26 are deactivated.

The brake shoes 22 can also be applied or released by using the winch 56 to change the position of the free pulleys 43. The brake shoes 22 can be applied by simply rotating the winch adjusting nut 57 to wind more cable around the winch 56 and thus move the free pulleys 43 and associated brake cable lines 70 towards the pulley assemblies 38, which in turn activates and applies the brake mechanisms 21. If it is desired to release the parking or emergency brake mechanisms 21 before the air pressure in cylinder 30 has risen above the predetermined level or if the air cylinder is inoperable, the brake mechanisms 21 may also be released by suitably adjusting the nut 57 on winch 56 to unwind cable 34 from the winch 56. Thus the free pulleys 43 will be moved away from the pulley assemblies 38, and the brake cable lines 70 will be released. This in turn will deactivate the brake mechanisms 21 and accordingly the brake shoes 22 will withdraw from contact with the brake drum 24.

Having thus described the invention, what is claimed as new and desired to be secured by Letters Patent is:

1. In a vehicle having a plurality of spaced apart adjacent compacting wheels, wherein at least some of said wheels have operably associated braking mechanisms, a control system for actuating said braking mechanisms comprising:
   a plurality of adjacent, spaced apart, pulley assemblies including a first and last pulley assembly, each of said assemblies including two side-by-side rotatably mounted fixed pulleys;
   a corresponding plurality of adjacent, spaced apart, free pulleys, each of said pulleys associated with respective assemblies;
   cable means linking each of said pulley assemblies to adjacent assemblies, and linking each of said assemblies to said corresponding free members by passing said cable means around one of said side-by-side pulleys to said free pulley and then back to said other side-by-side pulley, said cable means having two ends;
   selectively operable means for shortening said cable between said first assembly and said last assembly, so that said respective free pulleys move substantially simultaneously toward associated respective assemblies when said shortening means is applied, said one end of said cable means connecting said first assembly to said shortening means;
   an anchor point for the other end of said cable means;
   said other end of said cable means linking said last assembly to said anchor point; and
   a selectively operable actuator on each of said brake mechanisms for applying said brake mechanism to said wheels, each of said actuators connected with one of said free pulleys, so that said actuators are operated when said shortening means is operated, whereby the brake mechanisms of each wheel are substantially simultaneously applied.

2. The control system as claimed in claim 1 wherein said shortening means includes a spring loaded fluid cylinder and associated piston rod, said one end of said cable means connected to said rod, said rod retracting when the fluid pressure in said cylinder drops below a predetermined level, and said rod returning to an extended position when said fluid pressure returns above said predetermined level.

3. The control system as claimed in claim 2, wherein means is provided for selectively altering the position of said free pulleys regardless of said position of said rod.

4. The invention as claimed in claim 1, wherein each of said wheels has an associated braking mechanism, and further wherein said wheels are grouped in pairs, each pair of said wheels having a common axis, said actuators for both of said respective braking mechanisms for each pair of said respective wheels are connected with the same said free pulley.

5. The control system as claimed in claim 1 wherein said anchor point is a winch and said cable means is a continuous cable, the terminal end of said other end of said cable is wound around said winch a sufficient amount that said amount of cable between said first assembly and said last assembly can be increased without operating said selectively operated shortening means by unwinding said winch whereby said brake mechanisms are released, and further wherein said free members can be moved towards said assemblies without operating said shortening means by winding additional cable around said winch.

* * * * *